United States Patent
An

(10) Patent No.: US 9,718,422 B2
(45) Date of Patent: Aug. 1, 2017

(54) FRONT VEHICLE BODY REINFORCING STRUCTURE AND ASSEMBLING METHOD THEREOF

(71) Applicant: Hyundai Motor Company, Seoul (KR)

(72) Inventor: Kwang Hee An, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/921,488

(22) Filed: Oct. 23, 2015

(65) Prior Publication Data

US 2016/0368441 A1    Dec. 22, 2016

(30) Foreign Application Priority Data

Jun. 16, 2015   (KR) .................. 10-2015-0084919

(51) Int. Cl.
*B60R 19/04*   (2006.01)
*B60R 19/24*   (2006.01)
*B62D 21/15*   (2006.01)
*B62D 25/08*   (2006.01)

(52) U.S. Cl.
CPC ............ *B60R 19/24* (2013.01); *B62D 21/152* (2013.01); *B62D 25/082* (2013.01)

(58) Field of Classification Search
CPC ......... B60R 19/24; B62D 21/02; B62D 21/11; B62D 65/16; B62D 21/152
USPC .................. 296/203.02, 187.09, 193.09, 198
See application file for complete search history.

(56) References Cited

U.S. PATENT DOCUMENTS

| | | | | |
|---|---|---|---|---|
| 7,052,076 B2* | 5/2006 | Kim | ..................... | B62D 25/084 296/187.09 |
| 7,219,954 B2* | 5/2007 | Gomi | .................. | B62D 25/082 296/187.09 |
| 8,684,451 B1* | 4/2014 | Park | ..................... | B62D 25/082 296/203.02 |
| 2014/0049069 A1* | 2/2014 | Park | ..................... | B62D 25/082 296/187.09 |
| 2014/0049072 A1* | 2/2014 | Kim | ..................... | B62D 25/088 296/193.09 |
| 2014/0062106 A1* | 3/2014 | Han | ........................ | B60R 19/34 293/133 |

FOREIGN PATENT DOCUMENTS

KR    10-2014-0024654 A    3/2014

* cited by examiner

*Primary Examiner* — Jason S Morrow
*Assistant Examiner* — E Turner Hicks
(74) *Attorney, Agent, or Firm* — Morgan Lewis & Bockius LLP

(57) ABSTRACT

A front vehicle body reinforcing structure and an assembly method may include a front side member formed to extend along a length direction of a vehicle and respectively disposed at right and left sides along a width direction of the vehicle, a front fender apron member formed to extend along the length direction of the vehicle, disposed at the right and left sides along the width direction of the vehicle outside the front side member, and including a front tip end positioned at the front along the length direction of the vehicle, and a reinforcement member connecting the front tip end of the front fender apron member and the front side member to be reinforced.

12 Claims, 8 Drawing Sheets

FRONT VEHICLE BODY REINFORCING STRUCTURE AND ASSEMBLING METHOD THEREOF

CROSS-REFERENCE TO RELATED APPLICATION

The present application claims priority to and the benefit of Korean Patent Application No. 10-2015-0084919 filed on Jun. 16, 2015, the entire contents of which is incorporated herein for all purposes by this reference.

BACKGROUND OF THE INVENTION

Field of the Invention

The present invention relates to a front vehicle body reinforcing structure and an assembling method thereof. More particularly, the present invention relates to a front vehicle body reinforcing structure effectively responding to a small overlap crash by connecting a front tip end according to a length direction of a vehicle of a fender apron member configuring a front vehicle body of the vehicle to a front side member, and an assembling method thereof.

Description of Related Art

A front vehicle body is disposed at a front side of a vehicle based on a longitudinal direction of the vehicle, and is formed in a frame structure capable of forming an engine compartment. A front vehicle body includes a front end module which forms a front end of the engine compartment and wherein a cooling module, a head lamp, etc., are installed, a front fender apron member which forms both the left and right sides of the engine compartment and provides a space wherein a suspension system is disposed and where wheels are installed, and a dash panel which is disposed behind the engine compartment and partitions a passenger compartment from the engine compartment.

Also, a front side member extending in a longitudinal direction of a vehicle is disposed under the engine compartment in left and right directions in a widthwise direction of a vehicle, thereby reinforcing the structural strength of the front vehicle body. A sub-frame configured to support an engine and a transmission installed in the engine compartment, and a suspension system and so on, is disposed at a bottom of the front side member in the height direction of the vehicle, and is connected to the front side member.

The front fender apron member has a first end that is placed on and connected to an upper portion of the front side member at a predetermined position in a length direction, and a second end that is connected to a front pillar.

A bumper beam, which is formed to be extended in a width direction of the vehicle, is mounted on a front tip portion of the front side member to improve performance for coping with a frontal collision of the vehicle.

In a case in which the vehicle, which is provided with the front vehicle body having the aforementioned structure, undergoes a frontal collision with an obstacle or other vehicles when the vehicle travels, the bumper beam first absorbs impact energy while being deformed by receiving impact, the impact energy is further transferred to the front side member through the bumper beam such that the front side member further absorbs impact energy while being deformed by receiving impact, and the impact energy which is not absorbed by the front side member is distributed to and absorbed by other parts in a vehicle body such as the front fender apron member, the front pillar, and the like that are connected with the front side member.

However, in the conventional front vehicle body structure, the front tip end of the front fender apron member is connected to a predetermined part according to the length direction of the front side member through the bracket, but the connection stiffness between the front side member and the fender apron member through the bracket is weak such that the crash impact applied to the front side member is not effectively transmitted or dispersed to the front fender apron member through the bracket, and resultantly, there is a drawback that it is insufficient for response to a front small overlap crash of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body reinforcing structure and an assembly method thereof which reinforce connectivity between a front fender apron member and a front side member and improve performance for distributing impact energy to improve the performance responding to the front crash of the vehicle and the front small overlap crash, thereby further safety protecting passengers in the front crash accident of the vehicle.

A front vehicle body reinforcing structure includes: a front side member formed to extend along a length direction of a vehicle and respectively disposed at right/left sides along a width direction of the vehicle; a front fender apron member formed to extend along the length direction of the vehicle, disposed at the right/left sides along the width direction of the vehicle outside the front side member, and including a front tip end positioned at the front along the length direction of the vehicle; and a reinforcement member connecting the front tip end of the front fender apron member and the front side member to be reinforced.

A first end along the width direction of the vehicle of the reinforcement member may be inserted into the front tip end of the front fender apron member to be integrally combined, and a second end of the reinforcement member may be inserted inside the front side member at a predetermined portion along the length direction of the front side member to be integrally combined.

When the reinforcement member is connected to the front side member and the front fender apron member, the reinforcement member may have a structure that extends along the width direction of the vehicle.

The reinforcement member may include: an inner coupling part inserted inside the front side member to be combined; an outer coupling part inserted into the front tip end of the front apron member; and a connection part integrally connecting the inner coupling part and the outer coupling part.

The connection part may be inclined and extended from the inner coupling part outside the width direction of the vehicle and upward of the height direction of the vehicle to be combined to the outer coupling part.

The connection part, the inner coupling part, and the outer coupling part may respectively be formed of a rectangle block shape.

The front fender apron member may include: a front fender apron inner member positioned inside in the width direction of the vehicle; and a front fender apron outer member positioned outside in the width direction of the vehicle, and the front fender apron inner member and the front fender apron outer member may be combined to each other to form the front opening.

The front side member may include: a front side inner member having a cross-section of a "C" shape in additional to a lateral opening opened toward the outside along the width direction of the vehicle, and the inner coupling part may be inserted into the lateral opening to be integrally combined with the front side inner member.

The reinforcement member may include: an inner plate combined with the front side member; an outer plate combined with the front fender apron member; and two connection plates connecting the inner plate and the outer plate.

An assembly method of a front vehicle body reinforcing structure according to another exemplary embodiment of the present invention includes: manufacturing a front side compliance member including a front side inner member provided with a lateral opening; manufacturing a front side outer member to be divided into two; manufacturing a front fender compliance apron having a front fender apron member including a front tip end positioned at a front along a length direction of a vehicle; manufacturing a reinforcement member including an inner coupling part positioned inside along the width direction of the vehicle, an outer coupling part positioned outside, and a connection part connecting the inner coupling part and the outer coupling part; inserting the inner coupling part of the reinforcement member to the lateral opening of the front side inner member to be combined to an upper surface and a lower surface along a height direction of the vehicle of the front side inner member and an inner surface along the width direction of the vehicle; combining the front side outer member to the front side inner member to close the lateral opening of the front side inner member; and insert the outer coupling part of the reinforcement member to the front tip end of the front fender apron member.

According to the front vehicle body reinforcing structure and the assembly method thereof, by rigidly and integrally connecting the front tip end along the length direction of the vehicle of the front fender apron member at the predetermined along the length direction of the vehicle of the front side member through the reinforcement member, when the accident of the front crash of the vehicle or the front small overlap crash is generated, when the front fender apron member or the front side member receives the crash impact, the impact energy is effectively transmitted and dispersed to the front side member or the front fender apron member, thereby preventing excessive deformation of the front fender apron member or the front side member due to the concentration of the impact energy and reducing the injury of the passengers by appropriate dispersion of the impact energy.

By guiding the effective deformation of the front side member and the front fender apron member through the transmission and dispersion of the appropriate impact energy, it is unnecessary to install a separate reinforcement member to respond to the collision of the rear along the length direction of the vehicle of the front side member or the front of the vehicle at a center floor member, thereby achieving a reduction of a number of parts of the vehicle, the weight, and the cost.

Also, when the front small overlap crash accident of the vehicle is generated, by the rigid combination through the front fender apron member and the reinforcement member of the front side member, an angle shot mode in which the vehicle body that has crashed with a collision object is moved in the width direction of the vehicle is effectively generated, thereby preventing the excessive damage of the vehicle body as well as effectively reducing crash injury of the passengers.

The methods and apparatuses of the present invention have other features and advantages which will be apparent from or are set forth in more detail in the accompanying drawings, which are incorporated herein, and the following Detailed Description, which together serve to explain predetermined principles of the present invention.

Figure 1:
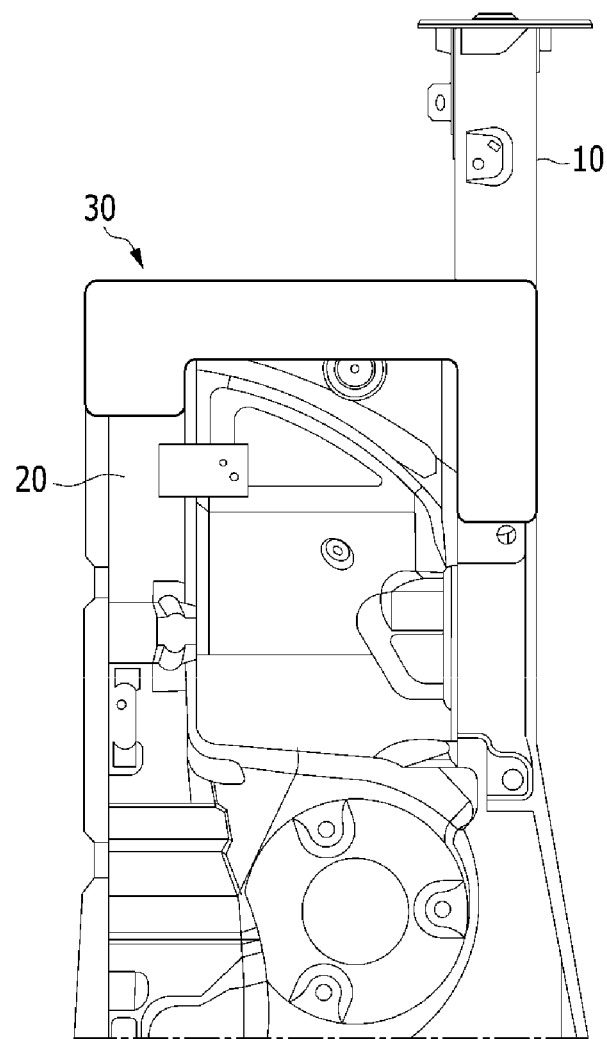
FIG. 1 is a top plan view of a front vehicle body reinforcing structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but further various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 2:
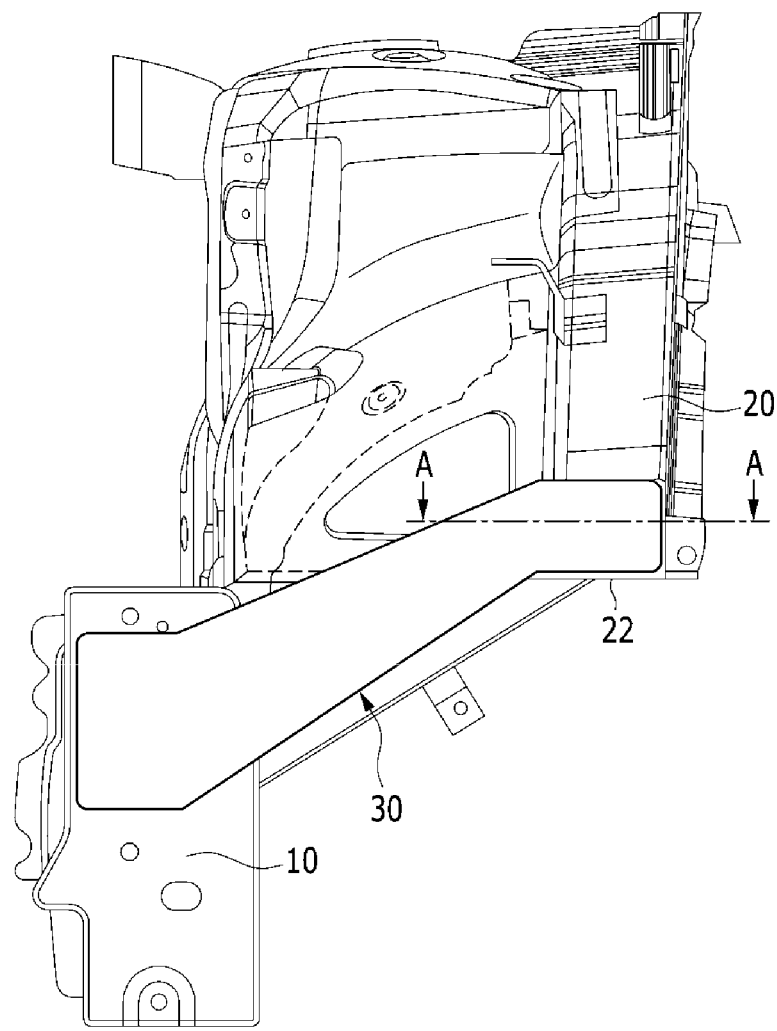
FIG. 2 is a front view of a front vehicle body reinforcing structure according to an exemplary embodiment of the present invention.
Figure 3:
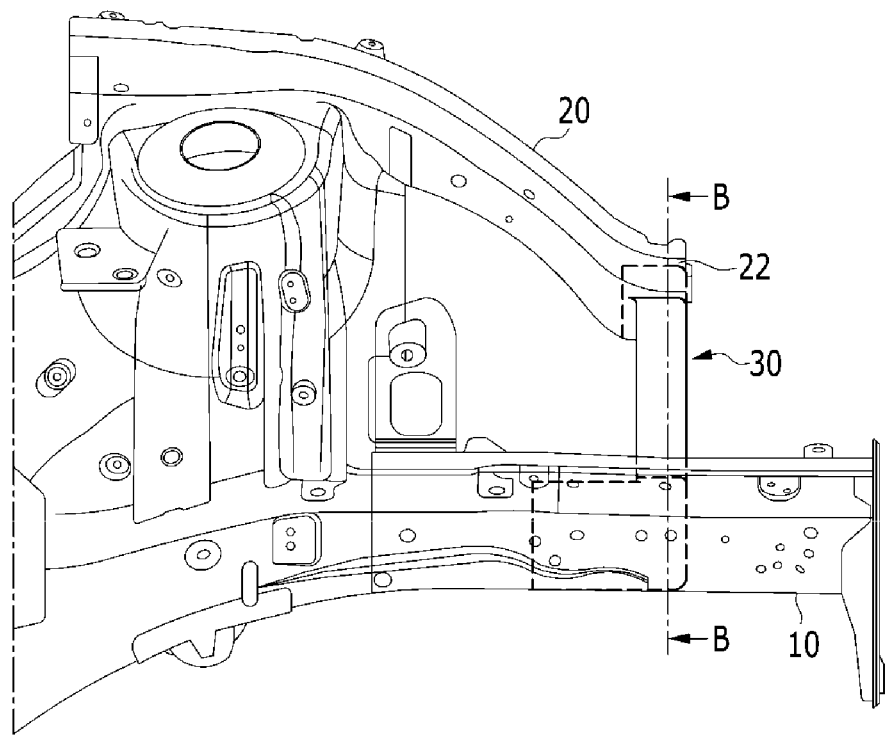
FIG. 3 is a lateral perspective view of a front vehicle body reinforcing structure according to an exemplary embodiment of the present invention.

Referring to FIG. 1 to FIG. 3, a front vehicle body of a vehicle to which an exemplary embodiment of the present invention is applied may include front side members 10 that are formed to be extended in a length direction of the vehicle and disposed at right/left sides along a width direction of the vehicle, and front fender apron members 20 that are formed to be extended in the length direction of the vehicle and disposed at the right/left sides along the width direction of the vehicle outside the front side member 10.

The front side member 10 and the front fender apron member 20 may be robustly integrally connected with each other through a reinforcement member 30.

A first end of the reinforcement member 30 is inserted to a front tip end 22 along a length direction of the vehicle of the front fender apron member 20 along the width direction of the vehicle to be integrally combined, and a second end along the width direction of the vehicle of the reinforcement member 30 is inserted inside the front side member 10 in a predetermined part along the length direction of the front side member 10 to be integrally combined.

When the reinforcement member 30 is combined to the front side member 10 and the front fender apron member 20 to connect the front side member 10 and the front fender apron member 20, the reinforcement member 30 may have a structure that is extended along the width direction of the vehicle.

Figure 4:
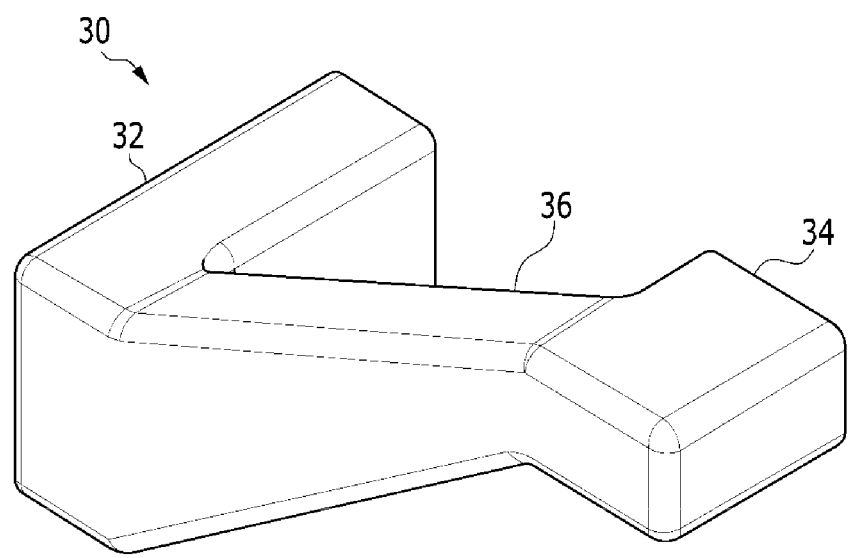
FIG. 4 is a perspective view of a front vehicle body reinforcement member according to an exemplary embodiment of the present invention.

Referring to FIG. 4, the reinforcement member 30 may include an inner coupling part 32 inserted inside the front side member 10 to be combined, an outer coupling part 34 inserted to the front tip end 22 of the front apron member 20 to be combined, and a connection part 36 integrally connecting the inner coupling part 32 and the outer coupling part 34.

The connection part 36 is inclined outside of the width direction of the vehicle and upward of the height direction of the vehicle from the inner coupling part 32 to be extended to be combined to the outer coupling part 34.

The connection part 36, the inner coupling part 32, and the outer coupling part 34 may be respectively formed of an approximately rectangular block shape.

Figure 5:
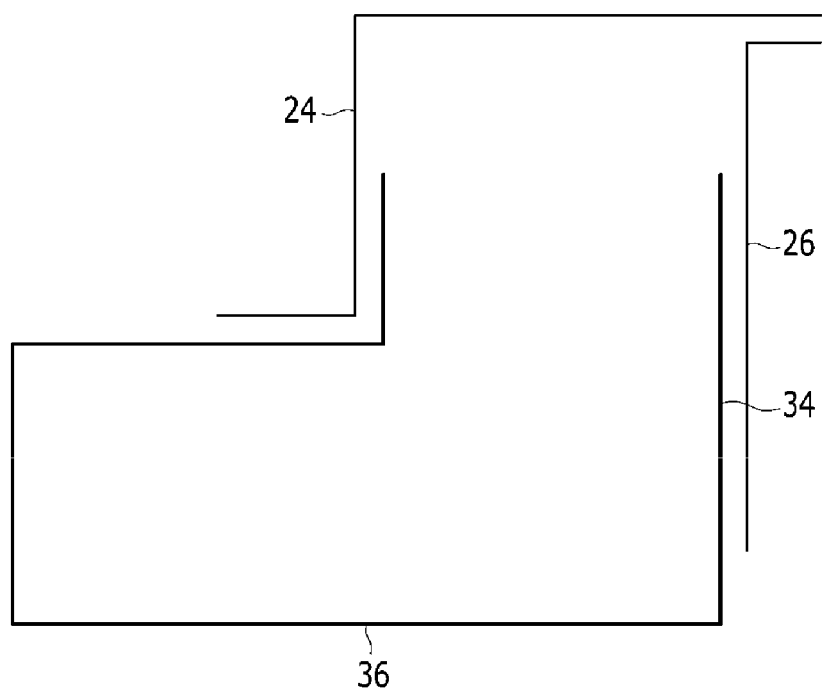
FIG. 5 is a cross-sectional view taken along a line A-A of FIG. 2.

Referring to FIG. 5, the front fender apron member 20 may include a front fender apron inner member 24 positioned inside and a front fender apron outer member 26 positioned outside in the width direction of the vehicle, the front fender apron inner member 24 and the front fender apron outer member 26 may be combined to form a front opening, and the outer coupling part 34 is inserted into the front opening to be integrally combined to the front fender apron inner member 24 and the front fender apron outer member 26.

Figure 6:
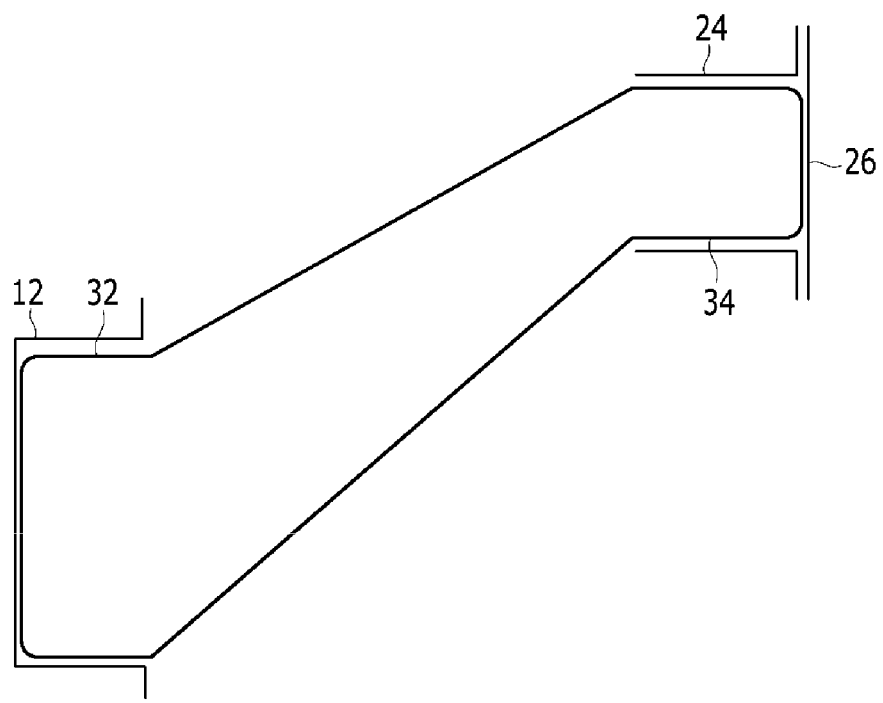
FIG. 6 is a cross-sectional view taken along a line B-B of FIG. 3.

Referring to FIG. 6, the front side member 10 may include a front side inner member 12 having the cross-section of an approximate "C" shape as well as a lateral opening that is opened toward the outside along the width direction of the vehicle, and the inner coupling part 32 is inserted into the lateral opening to be integrally combined with the front side inner member 12.

As described above, as the reinforcement member 30 having the block shape is respectively inserted inside the front tip end 22 of the front fender apron member 20 and the front side member 10 to be combined, the front side member 10 and the front fender apron member 20 are strongly combined to each other through the reinforcement member 30, thereby effectively increasing the structural rigidity of the front vehicle body, and when the front fender apron member 20 or the front side member 10 is applied with the crash impact when the accident of the front crash of the vehicle and/or the front small overlap crash is generated, the impact energy is effectively transmitted and dispersed to the front side member 10 or the front fender apron member 20, and accordingly, the excessive deformation of the front fender apron member 20 or the front side member 10 due to the concentration of the impact energy may be prevented, and the injury of the passengers may be reduced by the appropriate dispersion of the impact energy.

Also, when the front small overlap crash accident of the vehicle is generated, by the rigid combination through the front fender apron member 20 and the reinforcement member 30 of the front side member 10, an angle shot mode in which the vehicle body crashed with a collision object is moved in the width direction of the vehicle is effectively generated, thereby preventing the excessive damage of the vehicle body as well as effectively reducing crash injury of the passengers.

The reinforcement member 30 may be manufactured by a die casting method or a hot-blow method by using an aluminum material.

Figure 7:
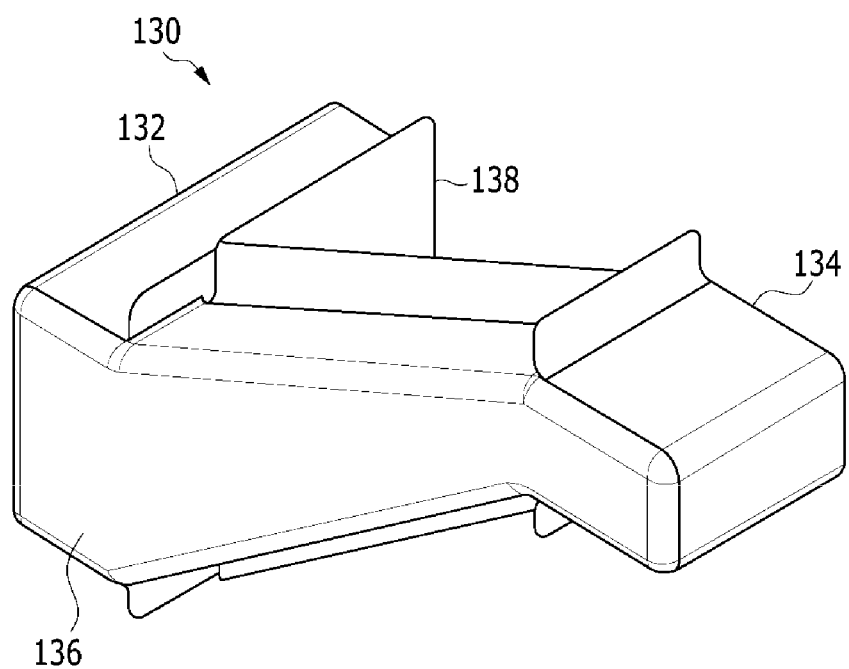
FIG. 7 is a perspective view of a front vehicle body reinforcement member according to another exemplary embodiment of the present invention.

Referring to FIG. 7, a reinforcement member 130 according to another exemplary embodiment of the present invention may be configured by respectively manufacturing an inner plate 132 forming the inner coupling part combined with the front side member 10, an outer plate 134 forming the outer coupling part combined with the front fender apron member 20, and two connection plates 136 and 138 forming the connection part connecting the inner plate 132 and the outer plate 134 by a press and combining them by a method such as welding.

Figure 8:
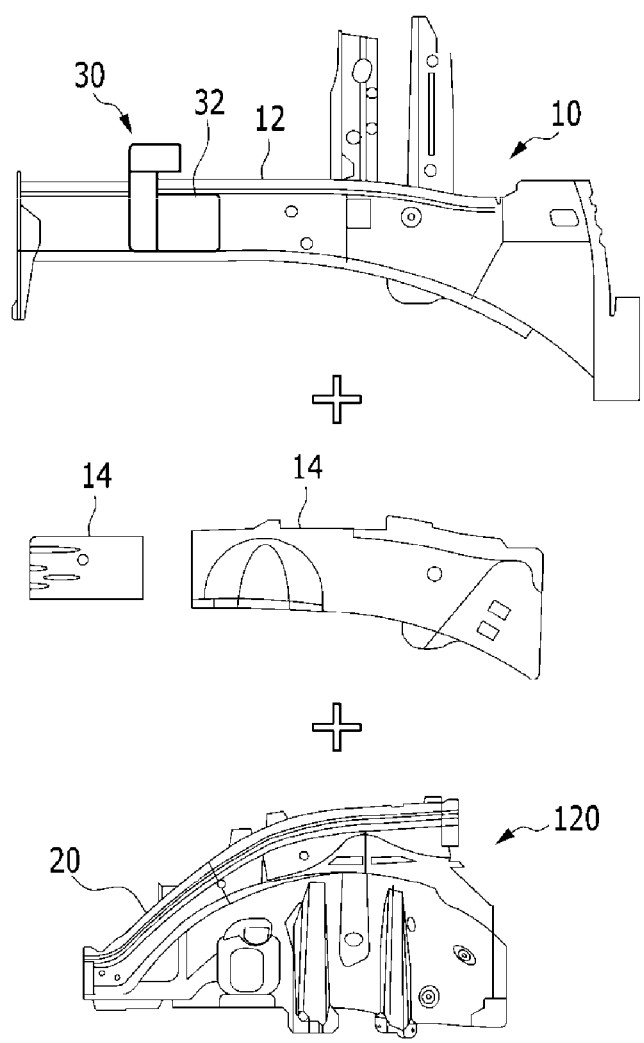
FIG. 8 is an assembly explanation view of a front vehicle body reinforcing structure according to an exemplary embodiment of the present invention.

Referring to FIG. 8, an assembly method of a front vehicle body reinforcing structure pre-assembles the reinforcement member 30 to a front side compliance member 110 including the front side inner member 10. That is, by inserting the inner coupling part 32 of the reinforcement member 30 into the lateral opening of a front side inner member 12, the inner coupling part is combined to the upper surface and the lower surface along the height direction of the vehicle of the front side inner member 12, and the inner surface along the width direction of the vehicle, by a welding or bolting method.

Next, a front side outer member 14 is pre-fabricated to be divided into two pieces and is combined to the front side inner member 12 to close the lateral opening of the front side inner member 12.

Next, a front fender compliance apron 120 including the front fender apron member 20 is prefabricated, and the outer coupling part 34 of the reinforcement member 30 is inserted to the front tip end 22 of the front fender apron member 20 to be combined by the welding or bolting method.

The assembly method of the front vehicle body reinforcing structure may easily assemble the front vehicle body reinforcing structure without a change of the conventional vehicle body assembly method.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure comprising:
a front side member formed to extend along a length direction of a vehicle and respectively disposed at right and left sides along a width direction of the vehicle;
a front fender apron member formed to extend along the length direction of the vehicle, disposed at the right and left sides along the width direction of the vehicle outside the front side member, and including a front tip end positioned at a front along the length direction of the vehicle; and
a reinforcement member connecting the front tip end of the front fender apron member and the front side member to be reinforced,
wherein a first end along the width direction of the vehicle of the reinforcement member is inserted into the front tip end of the front fender apron member to be integrally combined, and a second end of the reinforcement member is inserted inside the front side member at a predetermined portion along the length direction of the front side member to be integrally combined.

2. The front vehicle body reinforcing structure of claim 1, wherein, when the reinforcement member is connected to the front side member and the front fender apron member, the reinforcement member has a structure that extends along the width direction of the vehicle.

3. The front vehicle body reinforcing structure of claim 1, wherein the reinforcement member includes:
an inner coupling part inserted inside the front side member to be combined;
an outer coupling part inserted into the front tip end of the front apron member; and
a connection part integrally connecting the inner coupling part and the outer coupling part.

4. The front vehicle body reinforcing structure of claim 3, wherein the connection part is inclined and extended from the inner coupling part outside the width direction of the vehicle and upward of a height direction of the vehicle to be combined to the outer coupling part.

5. The front vehicle body reinforcing structure of claim 3, wherein the connection part, the inner coupling part, and the outer coupling part are respectively formed of a rectangle block shape.

6. The front vehicle body reinforcing structure of claim 3, wherein the front fender apron member includes:
a front fender apron inner member positioned inside in the width direction of the vehicle; and
a front fender apron outer member positioned outside in the width direction of the vehicle, and
wherein the front fender apron inner member and the front fender apron outer member are combined to each other to form a front opening.

7. The front vehicle body reinforcing structure of claim 3, wherein the front side member includes a front side inner member having a cross-section of a "C" shape in additional to a lateral opening opened toward the outside along the width direction of the vehicle, and the inner coupling part is inserted into the lateral opening to be integrally combined with the front side inner member.

8. The front vehicle body reinforcing structure of claim 1, wherein the reinforcement member includes:
an inner plate combined with the front side member;
an outer plate combined with the front fender apron member; and
two connection plates connecting the inner plate and the outer plate.

9. A method of assembling a front vehicle body reinforcing structure, comprising:
manufacturing a front side compliance member including a front side inner member provided with a lateral opening;
manufacturing a front side outer member to be divided into two;
manufacturing a front fender compliance apron having a front fender apron member including a front tip end positioned at a front along a length direction of a vehicle;
manufacturing a reinforcement member including an inner coupling part positioned inside along the width direction of the vehicle, an outer coupling part positioned outside, and a connection part connecting the inner coupling part and the outer coupling part;
inserting the inner coupling part of the reinforcement member into the lateral opening of the front side inner member to be combined to an upper surface and a lower surface along a height direction of the vehicle of the front side inner member and an inner surface along the width direction of the vehicle;
combining the front side outer member to the front side inner member to close the lateral opening of the front side inner member; and
inserting the outer coupling part of the reinforcement member into the front tip end of the front fender apron member.

10. The method of claim 9, wherein the connection part is inclined and extended from the inner coupling part outside in the width direction of the vehicle and upward in the height direction of the vehicle to be combined to the outer coupling part.

11. The method of claim 9, wherein the connection part, the inner coupling part, and the outer coupling part are respectively formed of a rectangle block shape.

12. The method of claim 9, wherein the reinforcement member includes:
an inner plate forming the inner coupling part combined with the front side member;
an outer plate forming the outer coupling part combined with the front fender apron member; and
two connection plates connecting the inner plate and the outer plate.

* * * * *